Aug. 25, 1936. H. WENDEBORN 2,052,329
PROCESS OF AND APPARATUS FOR GRANULATING FINE MATERIAL
BY ADHESION TO MOISTENED NUCLEAR FRAGMENTS
Filed March 8, 1934
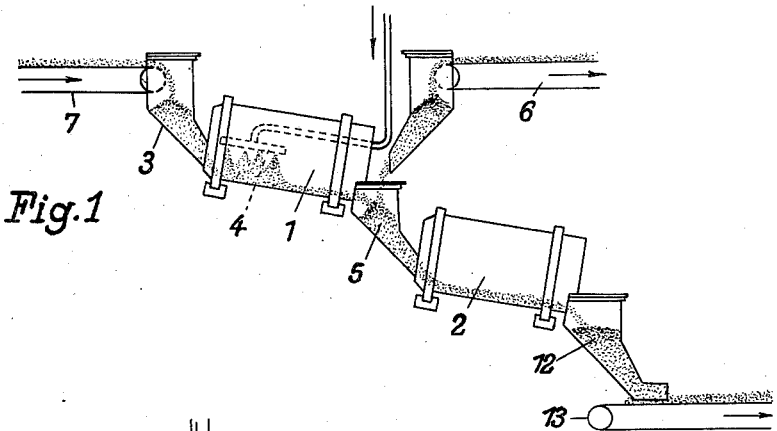
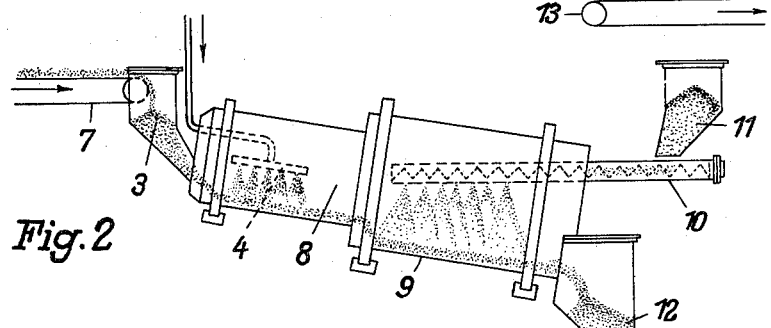
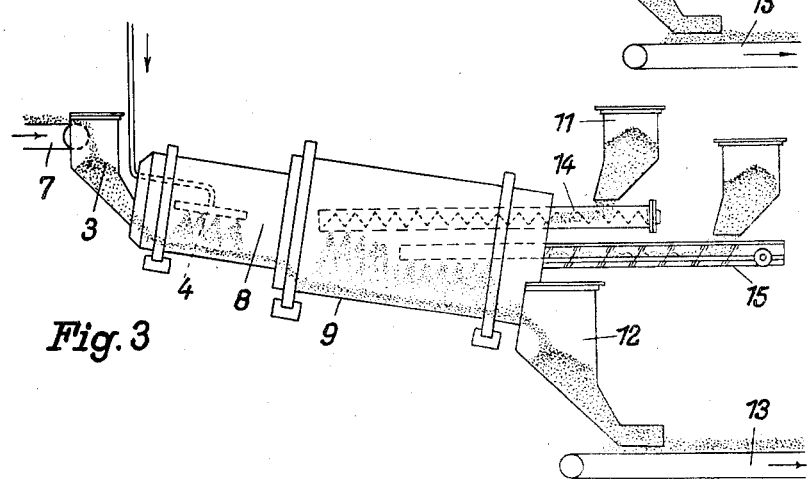
Inventor:
HELMUT WENDEBORN
By
Attorney Patented Aug. 25, 1936

2,052,329

UNITED STATES PATENT OFFICE 2,052,329

PROCESS OF AND APPARATUS FOR GRANULATING FINE MATERIAL BY ADHESION TO MOISTENED NUCLEAR FRAGMENTS

Helmut Wendeborn, Frankfort-on-the-Main, Germany, assignor to American Lurgi Corporation, New York, N. Y., a corporation of New York Application March 8, 1934, Serial No. 714,610
In Germany September 12, 1931

18 Claims. (Cl. 263—53)

This invention relates to a process of and apparatus for granulating fine material by adhesion to moistened nuclear fragments.

In treating fine-grained substances—such as flotation ores, raw cement meal of all kinds, fume dust and the like—in blast apparatus, such as Dwight and Lloyd apparatus, a preparatory treatment of the substances is necessary prior to the treatment in the blast apparatus. For this purpose said substances are first brought into a crumbly condition, or mixed with coarse material, such as sintered "returns"—that is to say, the fines below about 10 mm. in diameter, separated from sintered material by screening after leaving the sintering grate—or sintered material that has been crushed to the above mentioned size. At the same time, it is advisable to humidify the mixture to a certain degree, in order to prevent the fine particles from being carried off by the blast.

In preparing the charge from fine material and coarse-grained additions, it has hitherto been the practice to introduce the fine material, additions and humidifying agent jointly into the mixer. This method, however, gives rise to the inconvenience that the resulting mixture is not homogeneous, the small lumps of the additions failing to distribute uniformly among the fine-grained or dusty charge material. The latter cakes together in part, with the result that the conditions, in some parts of the blast-roast charge, give rise to the formation of an irregular and imperfectly sintered product. Thus, for example, in the sintering of sulphidic flotation ores, caked portions or lumps formed in the charge are incompletely desulphurized. Larger agglomerations of the raw materials for cement still remain partly unfinished after blast roasting, so that irregularities, adversely affecting the quality, occur in the finished product.

It is true that several processes are known for transforming the fine raw materials for cement into small or large balls, and thus make the raw meal suitable for burning or sintering in shaft furnaces. Fine ores have also been prepared for the shaft furnace in similar manner. For example, the raw material for cement has been stirred to a pulp, which was then allowed to dry in drums, small lumps being thereby formed, the dimensions of which were then increased by the addition of further raw materials. According to another process, the raw cement meal, which could already contain an admixture of fuel, was formed into small lumps in a worm, with the aid of water, these lumps being converted into others of large size, or spherical masses, by the addition of dry meal and further humidification. Finally, it has also been proposed to treat a thin pulp of raw cement meal and fuel with further quantities of dry raw meal—and also of fuel if desired—in a mixing drum, in such a manner as to produce the desired spherical masses during the further treatment.

These processes, however, are bound to fail if applied to bringing fine-grained or dusty material into a suitable grain-size for blast sintering. Even if they succeeded in producing globules or balls small enough for the blast treatment, the granular masses, which consist entirely of fine-grained or pulverulent material, would be partly disintegrated by the heat treatment. This would unduly lower the permeability of the charge to gas and greatly increase the losses due to the formation of dust. Although, in the likewise known formation of scales of raw cement meal on moistened fragments of coke in a mixing drum, into which the cement meal is added, in successive portions, to the coke, it might be possible, if the fragments of coke were sufficiently small, to obtain a granulation barely suitable for treatment by the sintering process; nevertheless, in such case the sintering would take a very long time and furnish irregular products, inasmuch as, in order to reach the core of coke, the air and the heat required for ignition must penetrate through the fairly compact shell of low thermal conductivity. Consequently, the process of combustion and the transmission of heat to the coke, and from the latter to the material to be sintered, are seriously checked, and the blast stage is accordingly prolonged. Moreover, this process would be successful only provided, the coke employed were of uniform and fairly coarse grain; whereas fuel of such grain-size is unsuitable for blast sintering. For that purpose it is of particular advantage to employ fuel that is at least below 3 mm. in diameter, the major portion of which may, furthermore, be in the condition of dust.

According to the present invention, fine material is prepared for blast sintering by allowing the fine material to adhere, as a coating, on a humidified solid core. The core, however, is composed of small fragments of substances which do not suffer any substantial change, if at all, in their chemical composition during the sintering process, "returns" for example, being highly suitable. In such case the fuel, if mixed, together with the fine material, with the materials forming the core, passes into the coating. It is still better to delay the incorporation of the fuel until granulation has been completed, because, in such case it chiefly becomes embedded between the individual grains.

If granulation be performed in this manner, the blast air can easily reach the fuel distributed over a large surface, and at the same time there is no difficulty in igniting the fuel. Moreover, there is no need for the sintering or roasting to penetrate as far as the centre of each grain, because—when "returns" are employed, for example—the core of each grain already consists of the end products from sintering or roasting. Accordingly, the sintering of a material prepared in accordance with the process of the present invention, proceeds very quickly and in an extremely uniform manner, even when the said material was of very fine grain.

In measuring the amounts of water serving to moisten the cores, it is preferable to give particular consideration to the special character of the cores and of the material to be granulated. For example, in granulating raw cement meal, a moisture content of 15% and less (for example, down to about 6%) in the finished granules has been found particularly suitable. In general, it is advisable to regulate the addition of water so that the finished mixture contains not more than 20% of moisture.

The water may also contain additions of substances—such as sulphite waste liquor, glue, metallic salts, saline solutions and the like—which facilitate the adhesion of the several particles of the fine material, among themselves and with the cores.

The material granulated in accordance with the present invention can be passed for further treatment, with or without being dried. For example, raw cement meal granulated in this manner can be freed, to a greater or smaller extent from the humidifying water, by drying, prior to being treated on the blast grate, for example, by means of hot gases formed in the sintering process itself, or otherwise available, thus enabling waste heat (for example) to be utilized at the same time. The strength of the granules is not only unimpaired thereby, but is also substantially increased, especially when adhesive substances have been added to the water.

In general, however, drying may also be dispensed with, and, in many instances, direct further treatment of the material that has been granulated in accordance with the present invention, without intermediate drying, is the most advantageous way, from the technical point of view.

The preparatory treatment according to the present invention is performed in the following manner: The coarse-grained substances forming the core—such as the so-called "returns" of sintered or roasted material from a previous charge, with a grain size below 6-10 mm.—are intimately mixed with the whole of the necessary humidifying agent, such as water, in a mixer of the kind usually employed for such a purpose, the fine material that is to be sintered not being added until this has been done. This fine material may be added in successive portions, or continuously. A suitable method, for example, is to strew or dust a continuous stream of the fine material on to the wet granular material in a mixer.

A further advantage of the process of the present invention consists in that the fine materials do not, as heretofore, come into contact with large quantities of liquid before they have become distributed in the rest of the material, but arrive, in the dry state, between the wet, coarse-grained additions, which then, by reason of their moisture, retain the fine material firmly on their surface, and in this manner become uniformly coated with the latter material. In these circumstances, there is no longer any possibility of the fine particles caking together in large quantities and forming lumps.

In order more clearly to understand the invention, reference is made to the accompanying drawing which illustrates diagrammatically and by way of example, several embodiments of apparatus suitable for carrying out the process.

Fig. 1 illustrates diagrammatically a side elevational view of an apparatus embodying the present invention and capable of carrying the invention into practice.

Fig. 2 shows a similar view of a modification of the apparatus shown in Fig. 1.

Fig. 3 depicts a diagrammatic side elevational view of still another form of apparatus embodying the present invention.

Fig. 1 shows two mixing drums 1 and 2, connected in series. The core material—for example sintered "returns"—is continuously introduced into the drum 1 by the aid of a belt conveyer 7 and a charging hopper 3. The drum 1 contains a sprinkler 4, by means of which the core material—such as "returns"—is wetted with water and brought to the necessary degree of humidity. After the moisture has been uniformly distributed over the fragments of material by rotating the drum, the material is passed through the chute 5 into the mixing drum 2. During the movement of the moistened core material through the chute 5, the fine material—such as raw cement meal, fine ore or the like—is fed by a belt conveyer 6 into the hopper above the chute 5 and on to the core material. The two materials are then thoroughly mixed together in the drum 2, from which they issue in a condition of granules, crumbs or small fragments admirably adapted for the blast-sintering process.

Another embodiment of a mixing plant is shown in Fig. 2. In this case, the device 8 for moistening the cores is mounted directly in the mixing drum 9, which is of somewhat larger diameter. The fine material is introduced into the drum 9 from a bunker 11 by means of a worm 10 or vibro conveyer. The bottom of the conveyer or worm is preferably perforated or designed as a screen, so that the fine material drops, onto the cores, in a distributed condition, such as in the form of a spray of dust. The completely granulated material then passes, as in the case of the apparatus according to Fig. 1, from the mixing drum into a bunker 12, from which it is removed to its destination by the belt conveyer 13.

If the fine material be composed of several constituents, such as raw cement meal and fuel, the apparatus according to Figs. 1 and 2 can also be employed, the mixture of the fine material being introduced into the mixing drum by way of the belt conveyer 6, or the worm or vibro conveyer. In some cases, however, it may be suitable to introduce the several constituents of the fine material separately into the mixing drum. As shown in Fig. 3, it is then advisable to employ a plurality of worms or vibro conveyers to introduce the constituents into the mixing drum. For example, in granulating raw cement meal, the raw meal is strewn in the mixing drum 9 by means of the worm 14, and the fuel by means of the vibro conveyer 15. This arrangement has the advantage that the fuel arrives on the surface of the individual grains and therefore can be subsequently most rapidly and completely burned on the blast grate. If there are more than two ingredients in the material, it is also possible, of course, to provide a corresponding number of charging devices.

The means for introducing the core material into the drums 8 in Figs. 2 and 3 may be the same as specified in Fig. 1.

In some instances very remarkable results can often be obtained by the employment of special measures in the preparation of the mixture. In burning Portland cement, alumina cement and also other cements, such as white cement and the like, a very high-grade product can be obtained, for example, by maintaining suitable proportions between the fine originating substances and the "returns" in preparing the mixture. There should be about 0.8–3 parts of "returns" to each 1 part of fine originating material, the lower proportions of "returns" applying to the production of alumina cement. In this connection, it is advisable, as already mentioned, to see that the finished mixture (fuel included) contains less than 20%—for example, 6–15%—of moisture. If the charge mixture for the blast grate be prepared in this manner, it assumes a condition ensuring a particularly favourable passage of the blast air through the charge. In this case, the optimum moisture content has the effect of preventing disintegration of the grains formed by the mixing operation, during the blast treatment, and of rendering still more advantageous the consumption of heat in the process.

In the further treatment on the blast grate, it is advisable to take into consideration, by the maintenance of special precautions, the special character of the charge mixture prepared according to the present invention. Thus, for example, it is advisable to adapt the depth of the charge on the blast grate in accordance with the granular or crumbly condition of the charge, in order to obtain particularly good and uniform permeability to the air. The depth of the charge on the grate should not be unduly high and is preferably less than 40 cm. The best results in respect of the quality of the product and throughput have been obtained with charges between 20 and 30 cm. deep. The pressure, or vacuum, under which the air of combustion is passed through the charge, plays also an important part. In the case of suction fans, the vacuum in the suction boxes situated below the grate, should be less than 120 cm. water gauge.

In some cases it may be preferable to place two or more layers of charge on the blast grate, each layer containing different proportions, in volume and weight, of raw material, "returns" and fuel. Since, for instance with induced draught, the lower layers of the charge are more extensively preheated, they may contain less fuel or "returns", and it is thus possible to effect a slight additional saving of fuel.

The fuel need not be ground, but, so far as is possible, should be of a grain size less than 3 mm.

I claim:—

1. In the process of preparing powdered inorganic material for sintering the steps which comprise thoroughly moistening comminuted core material having approximately the same composition as the sinter product of the powdered substances and tumbling said moistened cores with said powdered inorganic material to be sintered to form nodules with said last material forming the outer layer of the nodules.

2. In the process of preparing powdered inorganic material for sintering the steps which comprise tumbling comminuted sintered core material with a moistening agent to effect moistening of said cores and tumbling said moistened cores with said powdered inorganic material to be sintered to form nodules with said last material forming the outer layer of the nodules.

3. In the process of preparing powdered inorganic material for sintering the steps which comprise tumbling comminuted sintered core material with a moistening agent to effect moistening of said cores and tumbling said moistened cores with a mixture of said powdered inorganic material to be sintered and powdered fuel to form nodules with said mixture forming the outer layer of the nodules.

4. In the process of preparing powdered inorganic material for sintering the steps which comprise tumbling comminuted sintered core material with a moistening agent to effect moistening of said cores, tumbling said moistened cores with said powdered inorganic material to be sintered to form nodules with said last material forming the outer layer of the nodules, and tumbling said nodules with powdered fuel to form nodules having the fuel as their outer layer.

5. The process of preparing powdered inorganic material for sintering in a blast apparatus which comprises tumbling comminuted core material having approximately the same composition as the sintered product of the powdered substance with water to effect moistening of said cores, continuing tumbling of said moistened solid cores and strewing on the cores said powdered material to be sintered to form nodules with said last material forming the outer layer of the nodules.

6. The process of preparing powdered inorganic material for sintering in a blast apparatus which comprises tumbling sintered core material having a grain-size of less than about 10 mm. with water to effect moistening of said cores, continuing tumbling of said moistened cores and strewing on the cores said dry powdered material to be sintered to form nodules having the last material as their outer layer and containing not more than about 20% water.

7. The process of preparing powdered inorganic material for sintering in a blast apparatus which comprises tumbling sintered core material having a grain-size of less than about 6 mm. with water to effect moistening of said cores, continuing tumbling of said moistened cores and strewing on the cores as mixture of said powdered material to be sintered and of powdered fuel having a grain-size of less than about 3 mm. to form nodules having said mixture as their outer layer and containing not more than about 20% water.

8. The process of preparing powdered inorganic material for sintering in a blast apparatus which comprises tumbling sintered core material having a grain-size of less than about 10 mm. with water to effect moistening of said cores, continuing tumbling of said moistened cores, strewing on the cores said dry powdered material to be sintered to form nodules with said last material forming the outer layer of the nodules and strewing on said tumbling nodules powdered fuel having a grain-size of less than about 3 mm. to form nodules having the fuel as their outer layer and containing not more than about 20% water.

9. The process of preparing raw cement meal for sintering in a blast apparatus which comprises tumbling sintered core material having a grain size of less than about 10 mm. with water to effect moistening of said cores and tumbling said moistened cores with a sufficient amount of said raw cement meal to be sintered to form nodules containing about 1 part of raw cement meal to about 0.8 to about 3 parts of core material and about 6% to about 15% water with said raw cement meal forming the outer layer of the nodules.

10. The process of preparing powdered sulphidic flotation ores for sintering in a blast apparatus which comprises tumbling sintered core material having a grain size of less than about 10 mm. with water to effect moistening of said cores and tumbling said moistened cores with said powdered sulphidic ore to be sintered to form nodules having the powdered sulphid ore as their outer layer and containing less than about 20% water.

11. The process of preparing fume dust for sintering in a blast apparatus which comprises tumbling sintered core material having a grain size of less than about 10 mm. with water to effect moistening of said cores and tumbling said moistened cores with said fume dust to be sintered to form nodules having the fume dust as their outer layer and containing less than about 20% water.

12. An apparatus for preparing powdered inorganic materials for sintering which comprises a rotary mixing drum, means for introducing core material into said mixing drum, means for depositing water on the core material to effect moistening of said cores, and means for evenly strewing powdered material on said moistened cores while they move toward the exit end of the mixing drum to form nodules with said last material forming the outer layer of the nodules.

13. An apparatus for preparing powdered inorganic materials for sintering which comprises a rotary mixing drum, means for introducing core material into said mixing drum, means for depositing water on the core material to effect moistening of said cores, means for evenly strewing powdered material on said moistened cores while they move toward the exit end of the mixing drum to form nodules with said last material forming the outer layer of the nodules, and means for evenly strewing powdered fuel on said nodules while they move toward the exit end of said mixing drum to form nodules having fuel as their outer layer.

14. An apparatus for preparing powdered inorganic materials for sintering, which comprises a rotary mixing drum, means for introducing core material into said mixing drum, means for depositing water on the core material to effect moistening of said cores, and a screw conveyer within said mixing drum for evenly strewing powdered material on said moistened cores while they move toward the exit end of the mixing drum to form nodules with said last material forming the outer layer of the nodules.

15. An apparatus for preparing powdered inorganic materials for sintering which comprises a rotary mixing drum, means for introducing core material into said mixing drum, means for depositing water on the core material to effect moistening of said cores, and a conveyer within said mixing drum for evenly strewing powdered material on said moistened cores while they move toward the exit end of the mixing drum to form nodules with said last material forming the outer layer of the nodules.

16. An apparatus for preparing powdered inorganic materials for sintering which comprises a rotary mixing drum, means for introducing core material into said mixing drum, means for depositing water on the core material to effect moistening of said cores, a second mixing drum, means to convey said moistened cores from the first mixing drum to the second mixing drum, and means within the second drum for evenly strewing powdered material on said moistened solid cores to form nodules with said powdered material forming the outer layer of the nodules.

17. An apparatus for preparing powdered inorganic materials for sintering which comprises a rotary mixing drum, means for introducing core material into said mixing drum, means for depositing water on the core material to effect moistening of said cores, a second mixing drum, means to convey said moistened cores from the first mixing drum to the second mixing drum, and means for evenly strewing various powdered materials on said moistened cores at successive portions within said second mixing drum to form nodules comprising a solid core and successive layers of said powdered materials.

18. An apparatus for preparing powdered inorganic materials for sintering which comprises a rotary mixing drum, means for introducing core material into said mixing drum, means for depositing water on the core material to effect moistening of said cores, means for evenly strewing powdered material on said moistened solid cores while they are discharged from said mixing drum, and means for introducing said cores with said powdered material into a second rotary mixing drum to therein form nodules with said powdered material forming the outer layer of the nodules.

HELMUT WENDEBORN.